Sept. 16, 1969     M. L. GREENBERG ET AL     3,466,952
HYDROSTATIC BEARING SUPPORTED BORING BAR

Filed Dec. 6, 1967        7 Sheets-Sheet 1

INVENTORS
MYRON L. GREENBERG
& GORDON H. PORATH
BY
Barnes, Kisselle, Raisch & Choate
ATTORNEYS

Sept. 16, 1969  M. L. GREENBERG ET AL  3,466,952
HYDROSTATIC BEARING SUPPORTED BORING BAR Filed Dec. 6, 1967  7 Sheets-Sheet 2

INVENTORS
MYRON L. GREENBERG
& GORDON H. PORATH
BY
Barnes, Kisselle, Raisch &
Choate
ATTORNEYS Sept. 16, 1969 M. L. GREENBERG ET AL 3,466,952
HYDROSTATIC BEARING SUPPORTED BORING BAR
Filed Dec. 6, 1967 7 Sheets-Sheet 3

INVENTORS
MYRON L. GREENBERG
& GORDON H. PORATH
BY
Barnes, Kisselle, Raisch & Choate
ATTORNEYS

INVENTORS
MYRON L. GREENBERG
& GORDON H. PORATH
BY
Barnes, Kisselle, Raisch & Choate
ATTORNEYS

INVENTORS
MYRON L. GREENBERG
& GORDON H. PORATH
BY
Barnes, Kisselle, Raisch &
Choate
ATTORNEYS Sept. 16, 1969     M. L. GREENBERG ET AL     3,466,952
HYDROSTATIC BEARING SUPPORTED BORING BAR Filed Dec. 6, 1967     7 Sheets-Sheet 7

INVENTORS
MYRON L. GREENBERG
& GORDON H. PORATH
BY
Barnes, Kisselle, Raisch & Choate
ATTORNEYS

United States Patent Office 3,466,952
Patented Sept. 16, 1969

3,466,952
HYDROSTATIC BEARING SUPPORTED
BORING BAR
Myron L. Greenberg, Union Lake, and Gordon H.
Porath, Detroit, Mich., assignors to The Babcock
& Wilcox Company, New York, N.Y., a corporation of New Jersey
Filed Dec. 6, 1967, Ser. No. 688,415
Int. Cl. B23b 29/02, 39/00
U.S. Cl. 77—1                                    25 Claims

ABSTRACT OF THE DISCLOSURE

The apparatus disclosed herein comprises a tool support that is mounted in a housing by means of hydrostatic bearings in such a manner that the workpiece and tool support may be moved both axially and rotatably relative to one another to finish an existing rough or semifinished opening in a workpiece by boring. The tool support is movable or displaceable radially relative to the housing, to permit retraction without marring the surface of the opening that has been formed, by causing an unbalance in the fluid forces that are supporting the tool support. This is achieved by supplying additional fluid under pressure to pads on the support oriented with respect to the tool so that the apparent radial setting of the tool is changed during retraction.

---

This invention relates to boring and particularly the single point precision finish boring of both deep and shallow cylindrical openings in a workpiece.

BACKGROUND OF THE INVENTION

In the boring of deep or shallow openings in workpieces, it is conventional to provide relative motion axially between the workpiece and the tool and to cause relative rotation between the workpiece and the tool to form the opening. When the opening is completed, the tool must be retracted axially. In accurate work, this often causes a further cut of the tool along the previously formed surface of the bore or opening thereby marring the surface. This further cut occurs because as the tool is retracted axially, even the light finish contact with the workpiece deflects the tool sufficiently so that the inherent springback at the finish diameter will provide sufficient force to cause the tool to make a cut as it is retracted.

One technique that has been used to avoid such marring of the finish is to mount the tool in a boring head for movement on the tool support and then operate the head pneumatically, hydraulically or mechanically in order to move the tool radially out of position so that the tool support can be axially retracted. Such an arrangement results in lack of stiffness especially at the start of the work operation or when impacts are encountered due to hard spots or other force discontinuities in tool loading. This can lead to serious chatter conditions which shorten tool life and do not produce a satisfactory finish, and as the comparatively delicate parts of the retractor wear, a serious lack of repeatability.

Another technique that has been used is to stop the tool support in the fixed location by latching it, to mount the tool in the fixed position relative to the latch, and then to retract the tool by way of a draw bar or by moving the entire housing or tool support. Such an arrangement has the obvious disadvantage in that the tool support must be stopped in its rotation after each operation. In addition, complicated mechanism is required to operate the latch.

Another technique that has been used in hydrostatic bearing spindles is to program various pads in related sine waves or other cyclic wave forms so as to retract a tool in a progressive manner as it is rotated. However, the valving and control of such a system are complex and add to the expense as well as make it impossible for service personnel in an industrial plant to keep it operating. Such an arrangement is shown in the patent to Gerard 2,663,977.

Among the objects of the invention are to provide a method and apparatus for forming a bore or opening without the marred surface such as normally occurs by retraction of the tool; which apparatus is relatively simple and provides accurately formed openings; and which method and apparatus will retain full stiffness and repeatability over long periods of time and which obviates the need for complex mechanisms and which will function during rotation of the tool or when rotation of the tool is stopped.

SUMMARY

The apparatus disclosed herein comprises a tool support that is mounted in a housing by means of hydrostatic bearings in such a manner that the workpiece and tool support may be moved both axially and rotatably relative to one another to finish an existing rough or semifinished opening in a workpiece by boring. The tool support is movable or displaceable radially relative to the housing, to permit retraction without marring the surface of the opening that has been formed, by causing an unbalance in the fluid forces that are supporting the tool support. This is achieved by supplying additional fluid under pressure to pads on the support, oriented with respect to the tool so that the apparent radial setting of the tool is changed during retraction.

DESCRIPTION

Referring to FIGS. 1–5, the boring apparatus shown therein comprises a base 20 that is movable along a slide 21 toward and away from a workpiece holder 22 that supports a workpiece W. Base 20 is formed with an accurate cylindrical surface 23 and radial surfaces 24. A spindle or tool support 25 is rotatably mounted in the base 20 and includes a complementary cylindrical surface 26 and radial surfaces 27.

The cylindrical surface 23 of the base 20 is formed with two sets of circumferentially spaced pressure pads or recesses 28, each of which has a restrictor R which may be in the form of a capillary tube or the like associated therewith. Fluid is adapted to be supplied through inlets 29 to each of the pressure pads.

Each of the radial surfaces 24 of the base 20 is formed with circumferentially spaced pressure pads or recesses 31, each of which has a restrictor R associated therewith and to which fluid is supplied through an axial interconnecting passage 32 that extends from the radial passage 29.

When fluid such as liquid is supplied continuously to the pressure pads 28, 31, it flows in a thin film between the surfaces 23, 26 and 24, 27 to maintain the spindle 25 in accurate, stable, low friction relation to the base 20. The spindle 25 has a tool support 33 thereon which supports a tool T that forms or finishes the bore of the workpiece W. The relative dimensions of the adjacent surfaces of the base 20 and spindle 25 are such that a laminar film of liquid flows continuously at low velocity between the surfaces and the pressure of the liquid drops to zero as it leaves the surfaces. The number and size of the pressure pads are such as to support the load on the spindle 25 and will vary depending upon the size of the load to be supported. A minimum of three circumferentially spaced pads is required on journal surfaces although fewer can be used on thrust (radial) surfaces. The space between the surfaces 23, 26 and 24, 27 may range between two-thousandths (0.002) of an inch and one ten-thousandth (0.0001) of an inch. In larger size spindles or where machining limitations prevent obtaining uniform control of dimensions, satisfactory results will be achieved provided that at least some portions of the spaces between the surfaces are within the above limits.

The spindle 25 is adapted to be rotated with respect to the workpiece in order to perform a cutting action on the workpiece.

In accordance with the invention, the portion of the spindle 25 that is within the cylindrical opening 23 has restrictors 35 feeding pads 34 therein which are oriented circumferentially so that they lie substantially in the same plane and orientation circumferentially as the tool T. Fluid is adapted to be selectively supplied to the orifices 35 through radial passages 36 from axial passage 37, radial passages 38, annular groove 43 and radial passage 39 in the base. A solenoid operated valve 40 controls the flow of fluid to the restrictors 35. Valve 40 may be controlled in other ways as will be apparent.

Figure 7:
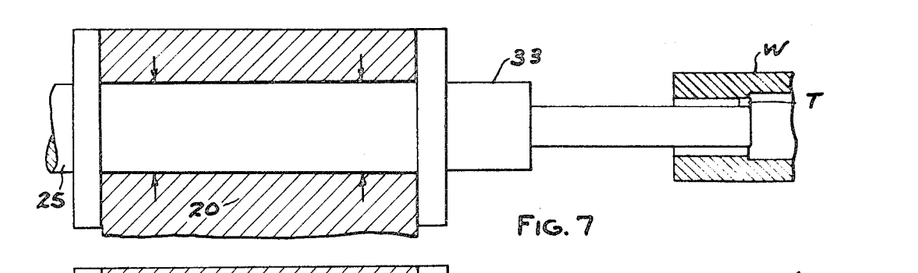
FIGS. 7 and 8 are diagrammatic views of the apparatus shown in FIGS. 1–6 in different operative positions.
Figure 8:
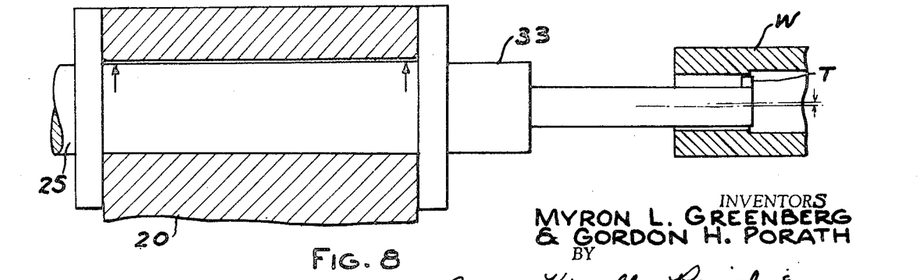

In accordance with the invention, the apparatus is operated in the normal fashion, as shown diagrammatically in FIG. 7, with fluid being supplied to the pressure pads 28, 31 while the spindle and, in turn, the tool T is being rotated with respect to the workpiece to form the opening in the workpiece. The slide carrying the tool is translated axially while it is rotated until the opening in the workpiece is completed. When it is desired to retract the tool, valve 40 is operated to supply fluid to the restrictors 35 and thereby increase the pressure between the surfaces 23, 26 in the area adjacent the orifices 35. This will displace the spindle radially as shown in exaggerated fashion in FIG. 8. Since the restrictors 34 are oriented circumferentially with respect to the tool T, the slight motion of the spindle radially will cause the tool T to be retracted and move radially away from the surface that has been formed in the workpiece so that when the spindle is moved axially for retraction, the tool will be out of contact with the workpiece and the surface that was formed in the workpiece will not be marred.

In order to produce maximum retraction force, the area of the recess 34 should be as large as practical. The retraction forces which are produced by the recesses are in opposition to the main bearing forces supplied by the pressure pads 28 and therefore a large retracting force is required which can only be achieved by making the recesses 34 as large as possible.

Where the tool T is to be rotated at high speeds, a diametrically opposed relieved area 41 is provided opposite each recess 34 and is as similar as possible in shape and size to the recess 34. Each relieved area 41 is vented to drain by a groove 42. This arrangement limits the heat generation in the film area which is swept by the retraction pads 34 and, in addition, when the retraction pads are unpressurized, minimizes the generation of hydro-dynamic forces.

In addition, the cooperating surface 23a is separated axially or longitudinally from the main pad area containing the pressure pads 23 by drain grooves 44a connected to the main drainage line 44. Surface 23a is smooth and unbroken and is thereby separated from the main pressure areas 23 so that one pressure area will not affect the other.

Figure 9:
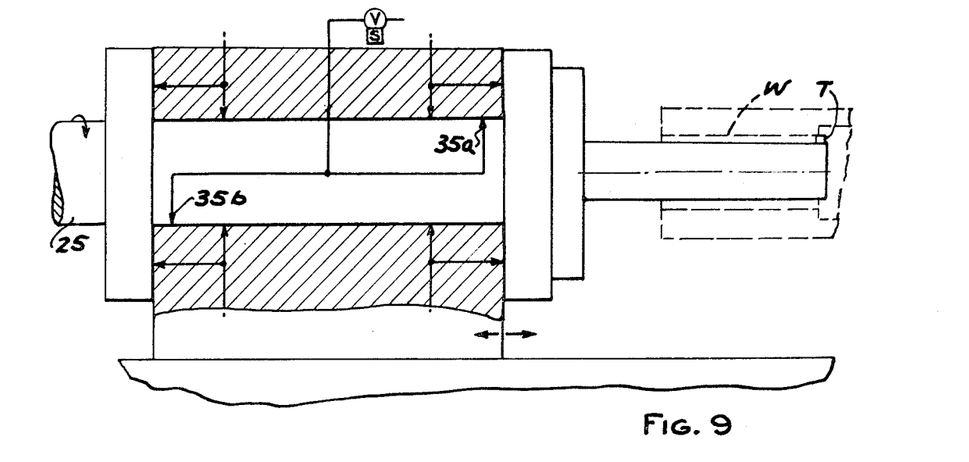
FIG. 9 is a fragmentary partly diagrammatic part sectional side elevational view of the invention.
Figure 10:
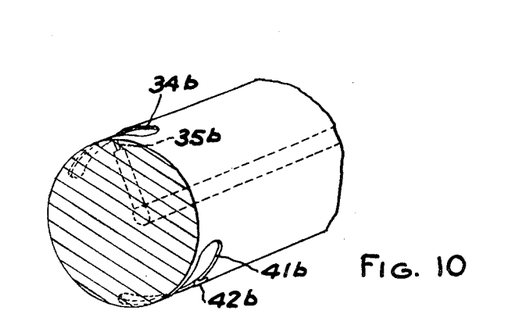
FIG. 10 is a fragmentary perspective view on an enlarged scale of a portion of the apparatus shown in FIG. 9.
Figure 11:
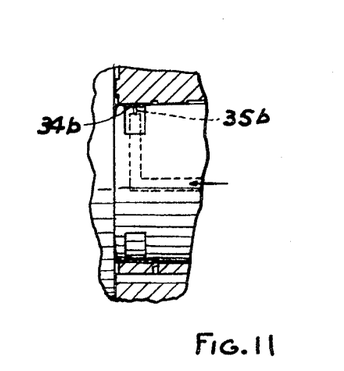
FIG. 11 is a fragmentary sectional view of a portion of the apparatus shown in FIG. 9.

The apparatus shown in FIGS. 9–11 is similar to the apparatus shown in FIGS. 1–4 except that the restrictors 35a, 35b and pads 34a, 34b are diametrically opposed and axially displaced relative to one another with the pad 34a on the same side as the tool T and the pad 34b diametrically opposed and axially displaced to produce a couple when fluid is supplied to the pads 34a, 34b and thereby cause a cocking motion of the spindle 25 to move the tool T away from the workpiece W.

As in the previous form of the invention, vented diametrically opposed recesses are provided. Specifically, a recess 41b is provided in diametrically opposed relation to pad 34b and a similar recess is provided in diametrically opposed relation to pad 34a. Each such recess is vented as at 42b.

Figure 12:
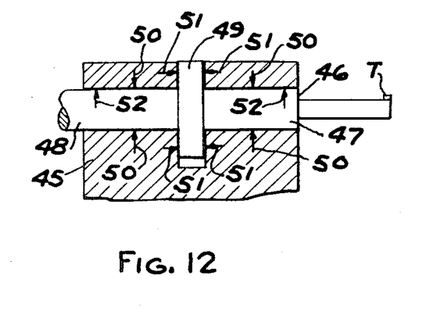
FIG. 12 is a fragmentary partly diagrammatic part sectional view of a further modified form of the invention.

As shown in FIG. 12, the invention is applied to a hydrostatic spindle which includes a base 45 having a rotatable member 46 which includes cylindrical portions 47, 48 separated by a radial flange 49. The base 45 includes complementary portions to the surfaces of the cylindrical portions 47, 48 and flange 49. Circumferentially spaced axial and radial pressure pads 50, 51 and associated restrictors are provided to which fluid under pressure is supplied in order to maintain the rotating member 46 which supports the tool T in stable accurate relation to the base 45. The rotating member 48 is provided with retractor pads 52 on the portions 47, 48 which are oriented with respect to the tool T so that when it is desired to retract the tool, fluid may be supplied to the retraction pads 52 as in the previous forms of the invention to move the tool radially so that the tool can be retracted by moving the base 45 axially. As in the previous forms of the invention where high speed applications are involved, recesses, not shown, are provided in diametrically opposed relation to the retraction pads 52.

Figure 13:
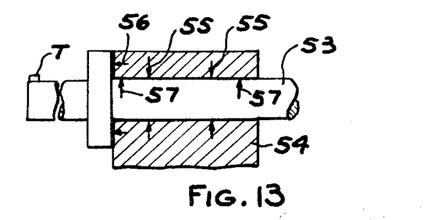
FIG. 13 is a fragmentary partly diagrammatic part sectional view of another form of the invention.

In the form of the invention shown in FIG. 13, the rotating member 53 has only one thrust face and is rotatably mounted on the base 54. Specifically, hydrostatic support for the member 53 is achieved by circumferentially spaced pressure pads 55 and associated restrictors and pressure pads 56 in the base 54 adjacent to complementary surfaces of the base and rotating member 53. Retraction pads 57 are provided on the rotating member 53 in oriented relation to the tool T in order that tool T can be retracted when fluid is supplied through restrictors to the pads 57. As in the previous forms, for high speed application, recesses are provided in diametrically opposed relation to the retraction pads 57.

Figure 14:
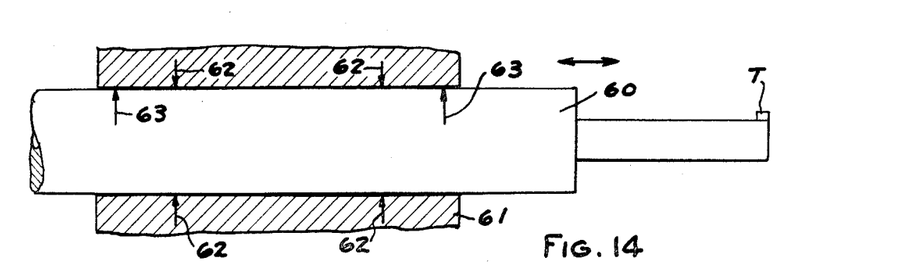
FIG. 14 is a fragmentary partly diagrammatic part sectional view of another form of the invention.

In FIG. 14, the invention is shown as applied to a hydrostatic quill such as shown in the patent to Porath, No. 3,200,671, issued Aug. 17, 1965. In this form, the quill 60 is mounted for axial movement in a base 61 and is supported in stable accurate relation thereto by circumferentially spaced sets of pressure pads 62 and associated restrictors. Retraction pads 63 are provided in oriented relation to the tool T so that when fluid is supplied thereto the tool is displaced radially to permit retraction by movement of the quill 60.

Figure 15:
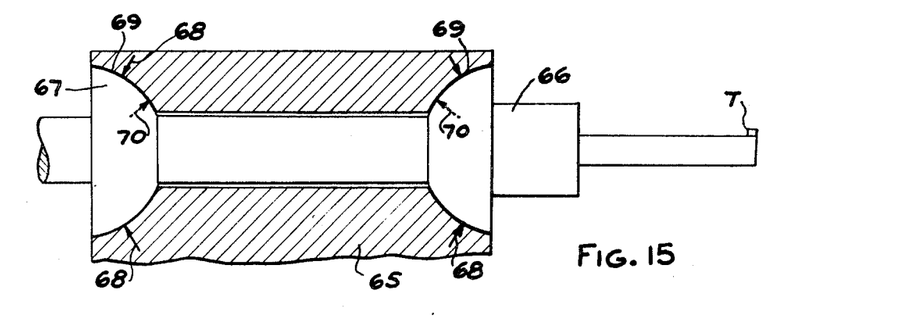
FIG. 15 is a fragmentary partly diagrammatic part sectional view of another form of the invention.

In the form of the invention shown in FIG. 15, the base 65 and rotating member 66 have complementary spherical surfaces 67, 68 such as shown in the patent to Whitney, 2,919,960, issued Jan. 5, 1960. The main bearing support for the rotatable member 66 is provided by circumferentially spaced pressure pads 69 in the surfaces 68 to which fluid is supplied under pressure through restrictors, not shown. The retraction pads 70 are provided in the rotatable member 66 in oriented relation to the tool T so that when fluid is supplied thereto, the tool T is moved radially sufficient to permit retraction by relative motion between the base 65 and the workpiece.

Figure 1:
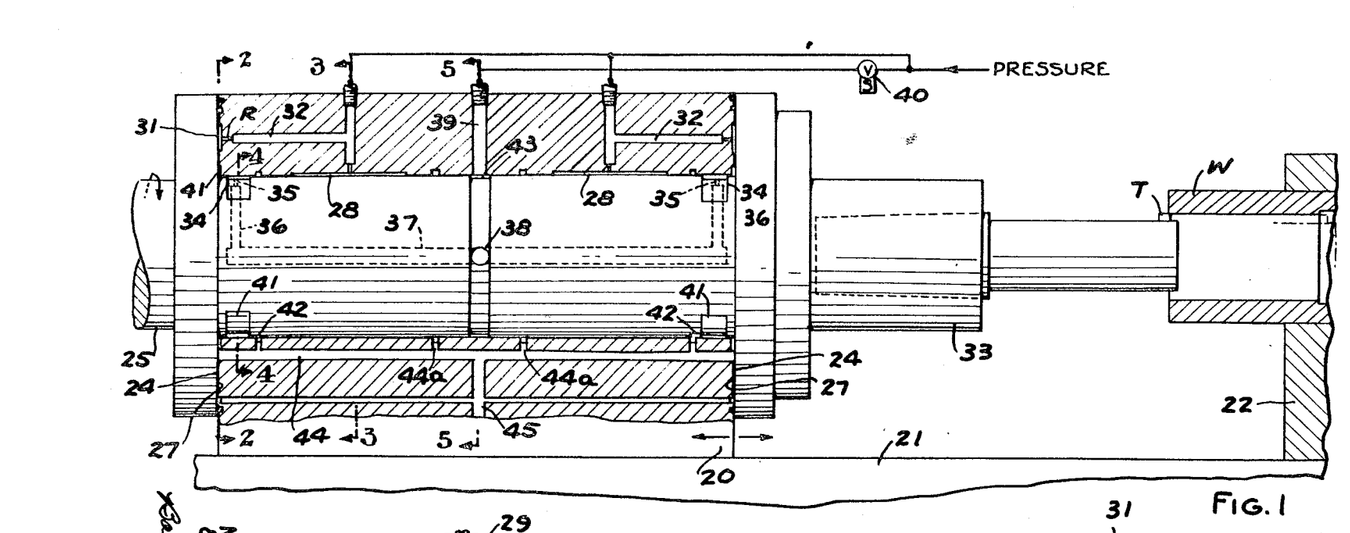
FIG. 1 is a part sectional partly diagrammatic side elevational view of an apparatus embodying the invention.
Figure 2:
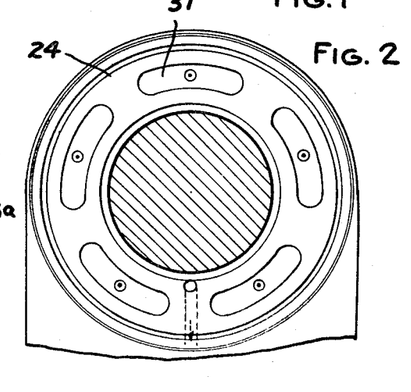
FIG. 2 is a fragmentary sectional view taken along the line 2—2 in FIG. 1.
Figure 3:
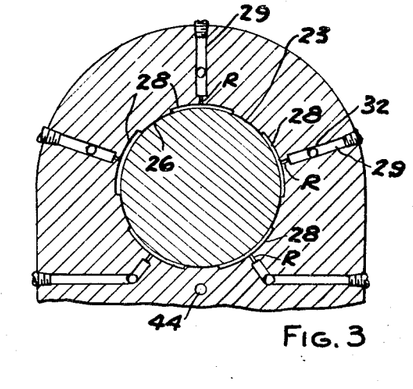
FIG. 3 is a fragmentary sectional view taken along the line 3—3 in FIG. 1.
Figure 4:
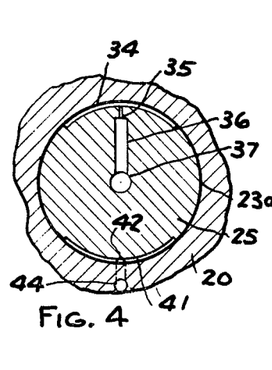
FIG. 4 is a fragmentary view taken along the line 4—4 in FIG. 1.
Figures 5, 6:
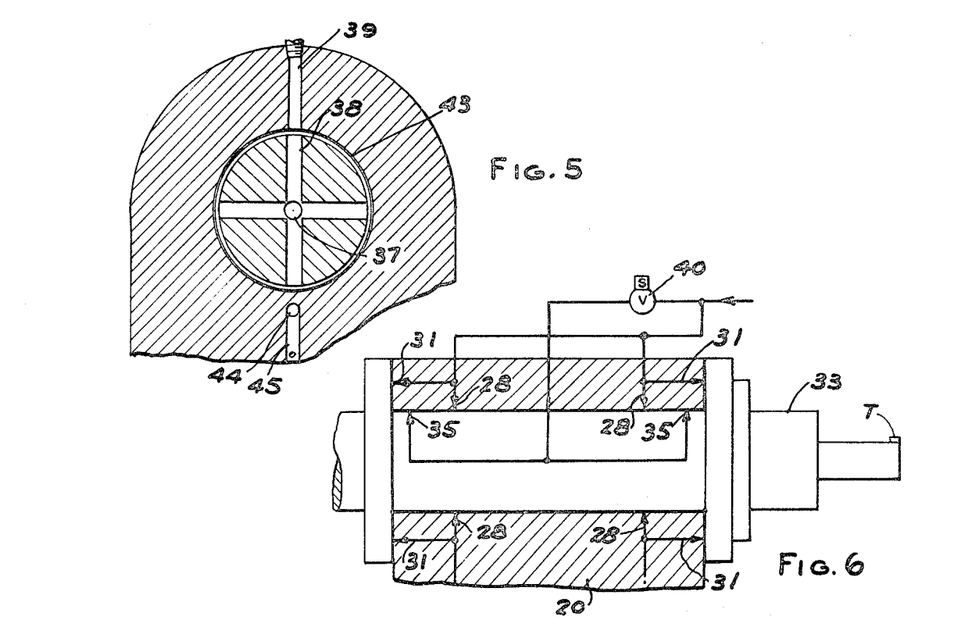
FIG. 5 is a fragmentary sectional view taken along the line 5—5 in FIG. 1.
FIG. 6 is a diagrammatic sectional view of the form of the invention shown in FIGS. 1–5.
Figure 16:
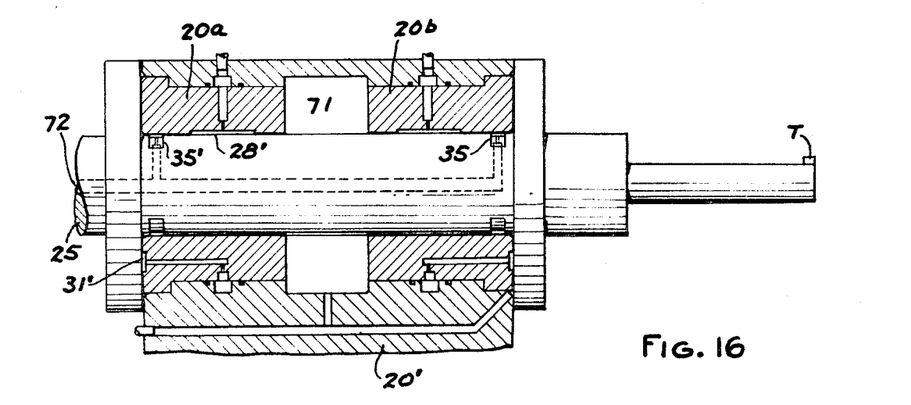
FIG. 16 is a partly diagrammatic part sectional view of another form of the invention.

The form of the invention shown in FIG. 16 is similar to that shown in FIG. 1 except that the base 20' is made in a plurality of sections including cylindrical inserts 20a, 20b in which the pressure pads 28', 31', are machined. In this form of the invention, a large central drain area 71 is provided and the fluid to the retraction pads 35' is supplied through an axial opening 72 in the spindle 25.

Figure 17:
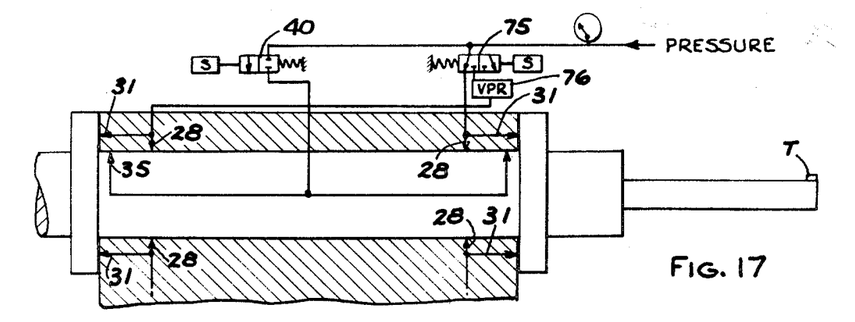
FIG. 17 is a diagrammatic sectional view of the apparatus shown in FIG. 16.

In each of the forms of the invention, in order to supplement the action of the retracting pads, it is possible to reduce the pressure supplied to the bearing pads that tend to maintain the rotating member in stable accurate relation to the nonrotating member. Thus, as shown in FIG. 17, which corresponds to the form of the invention shown in FIG. 1, the fluid is normally supplied directly to the hydrostatic pressure pads 28, 31 through a valve 75. When retraction is desired, valve 40 is actuated to supply fluid to the retraction pads 35. Simultaneously, the valve 75 is actuated to cause the fluid passing to the pressure pads 28, 31 to first flow through a pressure reducing valve 76 thereby reducing the pressure to the pressure pads 28, 31 and lessening the centering action of these pads so that the pressure supplied to the retraction pads will be more effective.

Figure 18:
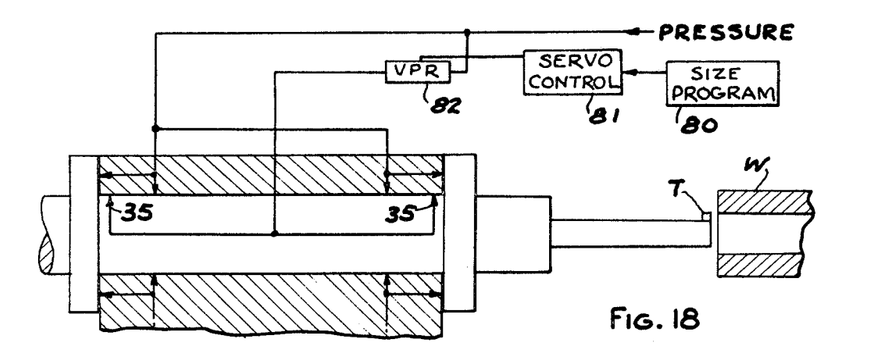
FIG. 18 is a fragmentary partly diagrammatic sectional view of another form of the invention.

Further in accordance with the invention, the action of the retraction pads may be utilized in order to obtain a more accurate predetermined size and shape of an opening that is being made. Thus, as shown in FIG. 18, a predetermined size program is supplied from a control unit 80 to a servo control 81 that modulates the flow through a valve 82 to the retraction pads 85 while the tool T is in contact with the workpiece W. In this fashion, the tool T will follow the predetermined program that is placed therein with respect to its radial position.

Figure 19:
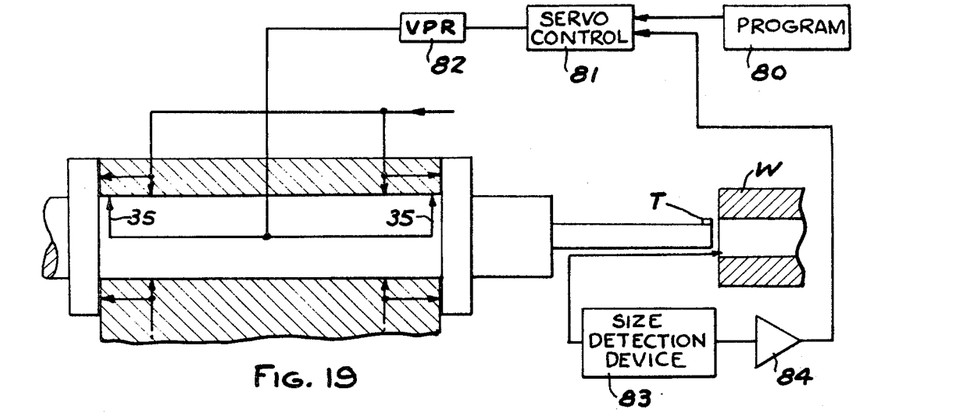
FIG. 19 is a fragmentary partly diagrammatic sectional view of another form of the invention.

In the form of the invention shown in FIG. 19, the system is further modified by the utilization of a size detection device 83 that produces a signal supplied to an amplifier 84 which is compared at the servo control 81 with the signal from the program 80 to produce a net signal that controls the flow control valve 82 supplying the retraction pads 35.

Figures 20, 21:
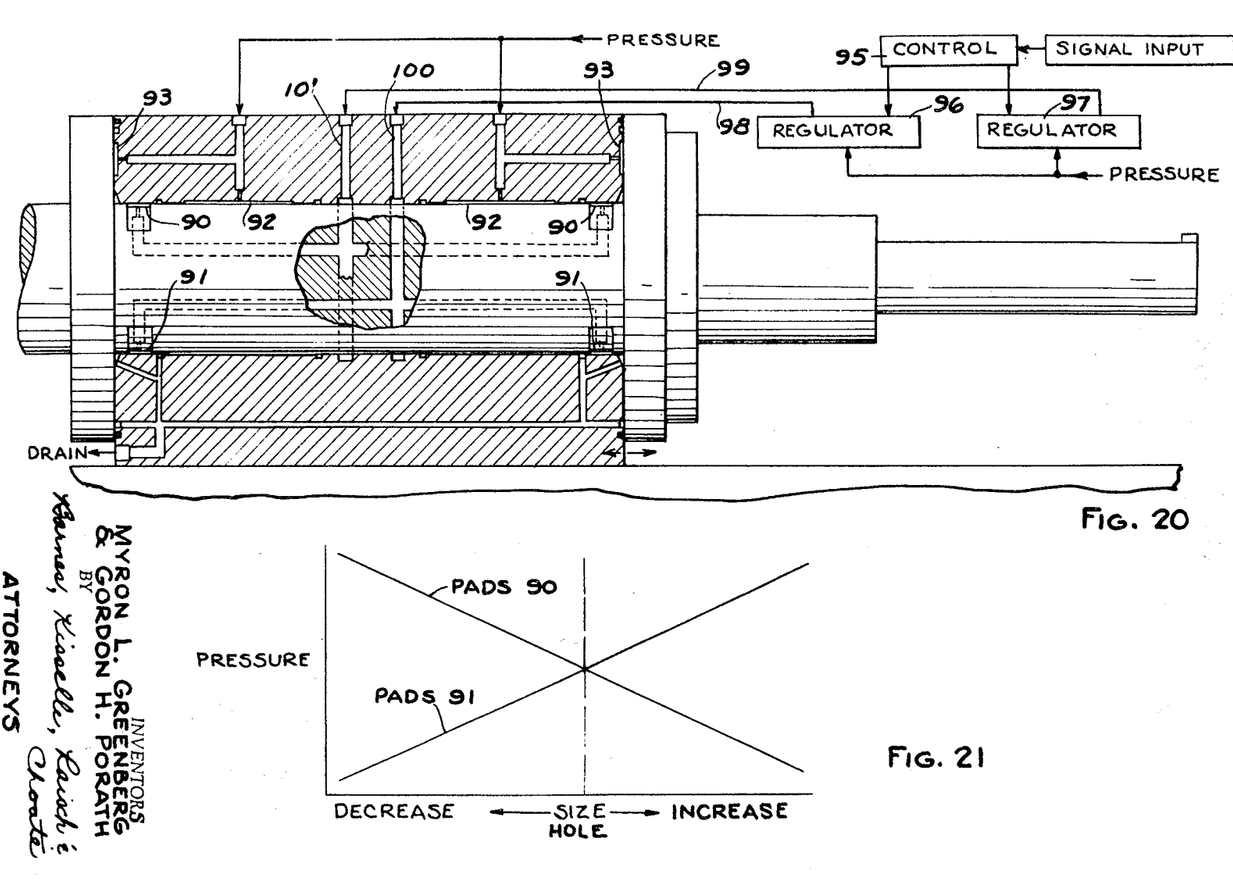
FIG. 20 is a partly diagrammatic longitudinal part sectional view of a further modified form of the invention.
FIG. 21 is a graph showing the relationship of pressure to or size for the form of the invention shown in FIG. 20.

In the form of the invention shown in FIG. 20, two diametrically opposed sets of pressure pads designated pads 90 and pads 91 and associated restrictors are provided in addition to the conventional circumferentially spaced hydrostatic bearing pads 92, 93. These pads 90 and 91 are controlled by an input signal through a control 95 and pressure regulators 96 and 97 through lines 98 and 99 and ports 100 and 101 in such a manner that both pads 90 and 91 are active or are being supplied with pressure. Thus, the pads 90, 91 cooperate depending upon the pressure therein to determine the position of the tool with respect to the base. This relationship is shown in the chart in FIG. 21. The control 95 can have an input signal provided thereto which is servoed in accordance with a size detection device, a tool wear detector, or an open-loop time program of expected tool wear.

Figure 22:
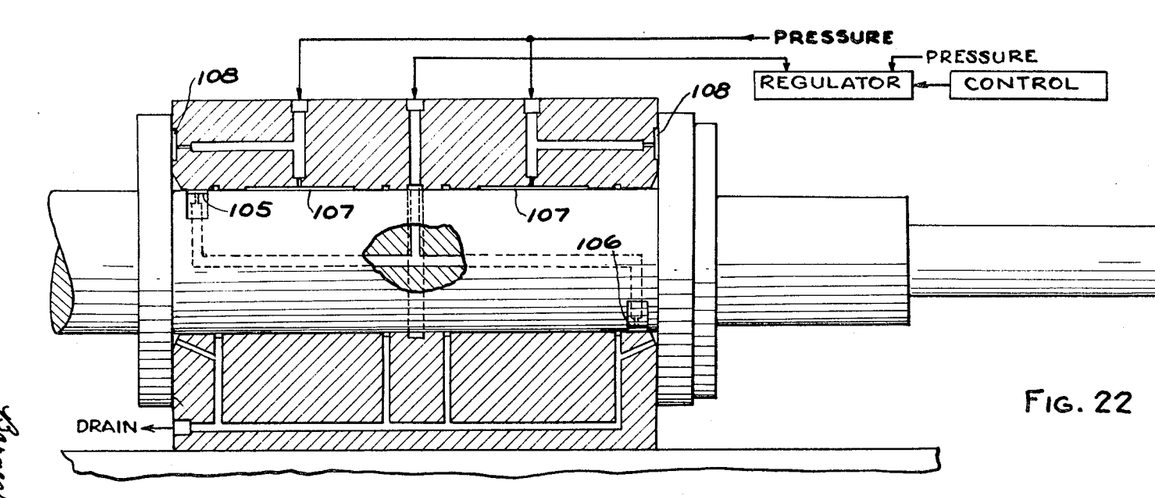
FIG. 22 is a partly diagrammatic longitudinal part sectional view of a further modified form of the invention.
Figure 23:
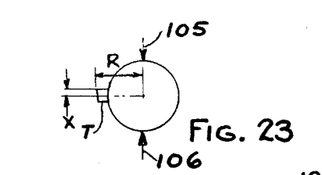
FIGS. 23–26 are diagrammatic end views showing the relationship of the tool and the plane of the pads in various adjusted positions of the form of the invention shown in FIG. 22.

In the form of the invention shown in FIG. 22, the pads 105, 106 and associated restrictors which are utilized for controlling the position of the tool, in addition to the normal hydrostatic bearing pads 107, 108 are positioned at longitudinally spaced and opposed points, in the manner of the form shown in FIG. 9 except that the plane of the centers of pads 105, 106 is oriented at an angle to the diametrical plane in which the tool lies. Thus, for example, FIG. 23, the tool is positioned at 90° with respect to the plane of the pads in the spindle supporting the tool. In such an arrangement, the radius of the hole or bore diameter size is equal to the relationship $$\sqrt{R^2+X^2}$$

Figure 24:
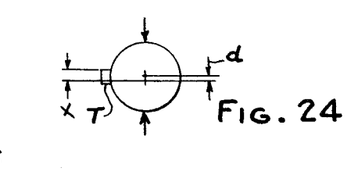

However, as shown in FIG. 24, if the tool is displaced by the distance $d$ from the center line of the spindle, the radius of the hole or bore then becomes $$\sqrt{R^2+(d+X)^2}$$

Figure 25:
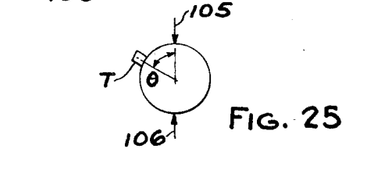
Figure 26:
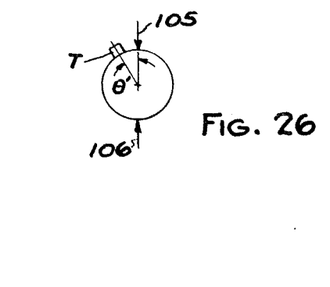

The hole size can be further increased by modifying the angle $\phi$ which the tool makes with the plane of the pads 105, 106 as shown in FIGS. 25 and 26.

Changing the orientation angle $\phi$ affords progressively finer control of hole size and progressively decreases total range of hole size as $\phi$ varies from zero to 90°.

We claim:
1. In a boring apparatus, the combination comprising a tool support having means thereon for supporting a tool,
a base,
said tool support and said base having complementary surfaces,
one of said surfaces having at least one set of circumferentially spaced pressure pads thereon,
a restrictor associated with each said pressure pad,
means for supplying fluid to each said restrictor,
means for moving said support and workpiece relative to one another,
a pressure pad in said tool support oriented circumferentially with respect to said tool adjacent a complementary surface of said base,
and means for supplying additional fluid under pressure to said pressure pad on said tool support for displacing the tool support radially with respect to the axis of the support to move a tool on said support away from a workpiece.

2. The combination set forth in claim 1 wherein said tool support is rotatably mounted in said base,
said first mentioned pressure pads being provided in said base.

3. The combination set forth in claim 2 including means for interrupting the flow of fluid to said last mentioned pressure pads.

4. The combination set forth in claim 2 including means for varying the supply of fluid to said last mentioned pressure pad.

5. The combination set forth in claim 2 including means for varying the flow of fluid to said first mentioned pressure pads and said last mentioned pressure pad.

6. The combination set forth in claim 2 wherein said tool support includes at least two axially spaced pressure pads and associated restrictors.

7. The combination set forth in claim 6 wherein said pressure pads on said tool support are axially spaced and generally diametrically opposed to one another.

8. The combination set forth in claim 6 wherein said pressure pads on said tool support are spaced axially from one another and on the same side of said tool support.

9. The combination set forth in claim 2 wherein said tool support includes a recess in diametrically opposed relation to the pressure pad therein.

10. In a boring apparatus, the combination comprising
a tool support,
a base,
said tool support and said base having complementary surfaces,
one of said surfaces having at least two longitudinally spaced sets of circumferentially spaced pressure pads thereon,
a restrictor associated with each said pressure pad,
means for supplying fluid to each said restrictor,
means for moving said support and workpiece relative to one another,
said tool support having at least two pressure pads therein oriented circumferentially with respect to said tool adjacent a complementary surface of said base,
and means for supplying additional fluid under pressure to said pressure pads on said tool support for displacing the support radially with respect to the axis of the support to move a tool on said support away from a workpiece.

11. The combination set forth in claim 10 wherein said tool support is rotatably mounted in said base, said first mentioned pressure pads being provided in said base.

12. The combination set forth in claim 11 wherein said tool support has at least two axially spaced pressure pads thereon.

13. The combination set forth in claim 12 wherein said pressure pads on said tool support are axially spaced and generally diametrically opposed to one another.

14. The combination set forth in claim 12 wherein said pressure pads on said tool support are spaced axially from one another and on the same side of said tool support.

15. The combination set forth in claim 12 including means for interrupting the flow of fluid to said last mentioned pressure pads.

16. The combination set forth in claim 15 including means for varying the supply of fluid to said last mentioned orifies.

17. The combination set forth in claim 12 wherein said tool support has a recess therein in diametrically opposed relation to each pressure pad therein.

18. The combination set forth in claim 12 including means for modulating the flow of fluid to said pressure pads in said tool support.

19. The combination set forth in claim 18 including means responsive to the position of the tool for modulating the flow of fluid to said additional pressure pads.

20. In a boring apparatus, the combination comprising
a tool support having means thereon for supporting a tool,
a base,
said tool support and said base having complementary surfaces,
one of said surfaces having at least one set of circumferentially spaced pressure pads thereon,
a restrictor associated with each said pressure pad,
means for supplying fluid to each said restrictor,
means for moving said support and workpiece relative to one another,
a pair of pressure pads in said tool support oriented circumferentially with respect to said tool adjacent a complementary surface of said base,
and means for supplying additional fluid under pressure to said pressure pads on said tool support for displacing the tool support radially with respect to the axis of the support to move a tool on said support away from a workpiece,
and means for selectively controlling the flow of fluid to said pads.

21. The combination set forth in claim 20 wherein said means for selectively controlling the flow of fluid is in turn controlled by a bore size detection device.

22. The combination set forth in claim 20 wherein said means for controlling the flow of fluid to said pair of pads is controlled by a tool wear detector.

23. The combination set forth in claim 20 wherein said means for controlling the flow of fluid to said pair of pads is controlled by a time program of expected tool wear.

24. The combination set forth in claim 20 wherein said means for controlling the flow of fluid to said pads is selectively controlled to cause displacement of said tool with respect to the center of said base so that the tool support is rotated eccentrically.

25. The combination set forth in claim 20 wherein said tool forms an acute angle with the plane of said pads.

References Cited

UNITED STATES PATENTS 2,663,977  12/1953  Gerard et al. _________ 51—100
3,260,162   7/1966  Atherton ____________ 77—3 XR GERALD A. DOST, Primary Examiner U.S. Cl. X.R.

77—56; 308—9